(12) United States Patent
Zhang

(10) Patent No.: US 10,429,686 B2
(45) Date of Patent: Oct. 1, 2019

(54) HEAT DISSIPATION MODULE AND LIQUID CRYSTAL DISPLAY

(71) Applicant: Shenzhen China Star Optoelectronics Technology Co., Ltd., Shenzhen (CN)

(72) Inventor: Yanxue Zhang, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/403,617

(22) Filed: May 6, 2019

(65) Prior Publication Data

US 2019/0258106 A1     Aug. 22, 2019

Related U.S. Application Data

(63) Continuation of application No. 15/529,502, filed on May 25, 2017, now Pat. No. 10,330,969.

(30) Foreign Application Priority Data

Mar. 13, 2017   (CN) .......................... 2017 1 0148149

(51) Int. Cl.
    *G02F 1/1333*    (2006.01)
    *G02F 1/1335*    (2006.01)
(52) U.S. Cl.
    CPC .. *G02F 1/133385* (2013.01); *G02F 1/133308* (2013.01); *G02F 1/133602* (2013.01); *G02F 2201/36* (2013.01)

(58) Field of Classification Search
    CPC ......... G02F 1/133385; G02F 1/133308; G02F 1/133602; G02F 2201/36
    See application file for complete search history.

(56) References Cited

U.S. PATENT DOCUMENTS

| | | | |
|---|---|---|---|
| 2008/0285290 A1* | 11/2008 | Ohashi ................. | G02B 6/0085 362/373 |
| 2011/0001898 A1* | 1/2011 | Mikubo ............ | G02F 1/133385 349/58 |
| 2012/0195002 A1* | 8/2012 | Kamei ...................... | G09F 9/30 361/695 |

* cited by examiner

*Primary Examiner* — Jessica M Merlin
(74) *Attorney, Agent, or Firm* — Leong C. Lei

(57) ABSTRACT

A heat dissipation module includes a plurality of airflow ducts that are arranged in an interior space of a heat dissipation chamber with two ends of the plurality of airflow ducts respectively connected to two end surfaces of the heat dissipation chamber and internal spaces of the plurality of airflow ducts in communication with the outside of the heat dissipation chamber. A plurality of pairs of fans are provided on the heat dissipation chamber to respectively correspond to the two ends of the plurality of airflow ducts. A coolant liquid is filled between outer walls of the airflow ducts and an inner wall of the heat dissipation chamber. The heat dissipation module is attachable to a lightbar of a liquid crystal display to effectively dissipate heat generated by the lightbar.

14 Claims, 5 Drawing Sheets

HEAT DISSIPATION MODULE AND LIQUID CRYSTAL DISPLAY

CROSS REFERENCE TO RELATED APPLICATIONS

This is a continuation application of co-pending patent application Ser. No. 15/529,502, filed on May 25, 2017, which is a national stage of PCT Application No. PCT/CN2017/079911, filed on Apr. 10, 2017, claiming foreign priority of Chinese Patent Application No. 201710148149.8, filed on Mar. 13, 2017.

BACKGROUND OF THE INVENTION

1. Field of the Invention

The present invention relates to the field of display technology, and more particular to a heat dissipation module and a liquid crystal display.

2. The Related Arts

Liquid crystal display (LCD) has various advantages, such as thin device body, low power consumption, and being free of radiation, and has wide applications, such as liquid crystal televisions, mobile phones, personal digital assistants (PDAs), digital cameras, computer screens, and notebook computer screens, so as to take a leading position in the field of flat panel displays.

Most of the LCDs that are currently available in the market are backlighting LCDs, which comprise a liquid crystal panel and a backlight module. The working principle of the liquid crystal panel is that a drive voltage is applied to a thin-film transistor (TFT) array substrate and a color filter (CF) substrate to control a rotation direction of the liquid crystal molecules located between the two substrates in order to refract out light emitting from the backlight module to generate an image.

Since the liquid crystal display panel itself does not emit light, light must be provided from the backlight module in order to normally display images. Thus, the backlight module is one of the key components of the LCDs. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal panel. The side-edge backlight module comprises an LED light bar, which is arranged rearward of one side of the liquid crystal panel to serve as a backlighting source.

With the continuous increase of resolution of the LCDs, the requirements for the brightness of the backlight module are getting severe. Heretofore, increasing the brightness of the backlight module would lead to an increase of the amount of heat generated by the light source. Poor dissipation of heat would cause reduction of lifespans of the backlight module and the LCD. This imposes a new challenge to the designs of heat dissipation structures.

SUMMARY OF THE INVENTION

An objective of the present invention is to provide a heat dissipation module, which has excellent heat dissipation performance and is applicable to a liquid crystal display to effectively dissipate heat generated by a light bar so as to enhance service life of the liquid crystal display.

Another objective of the present invention is to provide a liquid crystal display that has excellent heat dissipation performance and extended service life.

To achieve the above objectives, the present invention provides a heat dissipation module, which comprises a hollow heat dissipation chamber, a plurality of first heat dissipation fins arranged on a side surface of the heat dissipation chamber and extending to outside of the heat dissipation chamber, a plurality of airflow ducts arranged in an interior space of the heat dissipation chamber and each having two ends respectively connected to two end surfaces of the heat dissipation chamber, and a plurality of pairs of cocurrent fans arranged on the two end surfaces of the heat dissipation chamber to respectively correspond to the two ends of the plurality of airflow ducts, the two end surfaces of the heat dissipation chamber being provided with a plurality of first airflow openings respectively corresponding to the two ends of the plurality of airflow ducts, internal spaces of the plurality of airflow ducts being set in communication with an outside space of the heat dissipation chamber through the first airflow openings.

Each pair of cocurrent fans is arranged in the first airflow openings corresponding thereto.

The plurality of airflow ducts are arranged parallel to uniformly distributed in the interior space of the heat dissipation chamber.

The heat dissipation module further comprises a coolant liquid filled between outer walls of the airflow ducts and an inner wall of the heat dissipation chamber.

The heat dissipation module further comprises a plurality of second heat dissipation fins arranged on the side surface of the heat dissipation chamber on which the first heat dissipation fins are arranged and extending into the interior space of the heat dissipation chamber, the plurality of second heat dissipation fins respectively corresponding, in position, to the plurality of first heat dissipation fins, the first heat dissipation fins having a height greater than a height of the second heat dissipation fins.

The present invention also provides a liquid crystal display, which comprises a display module, a heat dissipation module arranged on a back of the display module, and a lightbar arranged on a side of the heat dissipation module that is adjacent to the display module;

wherein the heat dissipation module comprises a hollow heat dissipation chamber, a plurality of first heat dissipation fins arranged on a side surface of the heat dissipation chamber that is distant from the lightbar and extending to outside of the heat dissipation chamber, a plurality of airflow ducts arranged in an interior space of the heat dissipation chamber and each having two ends respectively connected to two end surfaces of the heat dissipation chamber, and a plurality of pairs of cocurrent fans arranged on the two end surfaces of the heat dissipation chamber to respectively correspond to the two ends of the plurality of airflow ducts, the two end surfaces of the heat dissipation chamber being provided with a plurality of first airflow openings respectively corresponding to the two ends of the plurality of airflow ducts, internal spaces of the plurality of airflow ducts being set in communication with an outside space of the heat dissipation chamber through the first airflow openings.

Each pair of cocurrent fans is arranged in the first airflow openings corresponding thereto; and the plurality of airflow ducts are arranged parallel to uniformly distributed in the interior space of the heat dissipation chamber.

The heat dissipation module further comprises a coolant liquid filled between outer walls of the airflow ducts and an inner wall of the heat dissipation chamber.

The heat dissipation module further comprises a plurality of second heat dissipation fins arranged on the side surface of the heat dissipation chamber on which the first heat dissipation fins are arranged and extending into the interior space of the heat dissipation chamber, the plurality of second heat dissipation fins respectively corresponding, in position, to the plurality of first heat dissipation fins, the first heat dissipation fins having a height greater than a height of the second heat dissipation fins.

The liquid crystal display further comprises an enclosure that is arranged on the back of the display module and houses the heat dissipation module;

wherein the enclosure comprises a casing, a plurality of heat dissipation holes formed in the casing, and a plurality of second airflow openings respectively corresponding to the plurality of pairs of cocurrent fan.

The present invention further provides a liquid crystal display, which comprises a display module, a heat dissipation module arranged on a back of the display module, and a lightbar arranged on a side of the heat dissipation module that is adjacent to the display module;

wherein the heat dissipation module comprises a hollow heat dissipation chamber, a plurality of first heat dissipation fins arranged on a side surface of the heat dissipation chamber that is distant from the lightbar and extending to outside of the heat dissipation chamber, a plurality of airflow ducts arranged in an interior space of the heat dissipation chamber and each having two ends respectively connected to two end surfaces of the heat dissipation chamber, and a plurality of pairs of cocurrent fans arranged on the two end surfaces of the heat dissipation chamber to respectively correspond to the two ends of the plurality of airflow ducts, the two end surfaces of the heat dissipation chamber being provided with a plurality of first airflow openings respectively corresponding to the two ends of the plurality of airflow ducts, internal spaces of the plurality of airflow ducts being set in communication with an outside space of the heat dissipation chamber through the first airflow openings;

wherein each pair of cocurrent fans is arranged in the first airflow openings corresponding thereto; and the plurality of airflow ducts are arranged parallel to uniformly distributed in the interior space of the heat dissipation chamber; and wherein the heat dissipation module further comprises a coolant liquid filled between outer walls of the airflow ducts and an inner wall of the heat dissipation chamber.

The efficacy of the present invention is that the present invention provides a heat dissipation module, and a plurality of airflow ducts are arranged in an interior space of a heat dissipation chamber with two ends of the plurality of airflow ducts being respectively connected to two end surfaces of the heat dissipation chamber and internal spaces of the plurality of airflow ducts set in communication with the outside of the heat dissipation chamber, and further, a plurality of pairs of cocurrent fans are provided on the heat dissipation chamber to respectively correspond to the two ends of the plurality of airflow ducts and a coolant liquid is filled between outer walls of the airflow ducts and an inner wall of the heat dissipation chamber so that the heat dissipation module is applicable to a liquid crystal display to effectively dissipate heat generated by a lightbar and thus extend the lifespan of the liquid crystal display. The present invention provides a liquid crystal display, which includes the above-described heat dissipation module to provide excellent performance of heat dissipation and extended lifespan.

BRIEF DESCRIPTION OF THE DRAWINGS

For better understanding of the features and technical contents of the present invention, reference will be made to the following detailed description of the present invention and the attached drawings. However, the drawings are provided only for reference and illustration and are not intended to limit the present invention.

In the drawings.

DETAILED DESCRIPTION OF THE PREFERRED EMBODIMENTS

To further expound the technical solution adopted in the present invention and the advantages thereof, a detailed description will be given with reference to the preferred embodiments of the present invention and the drawings thereof.

Figure 1:
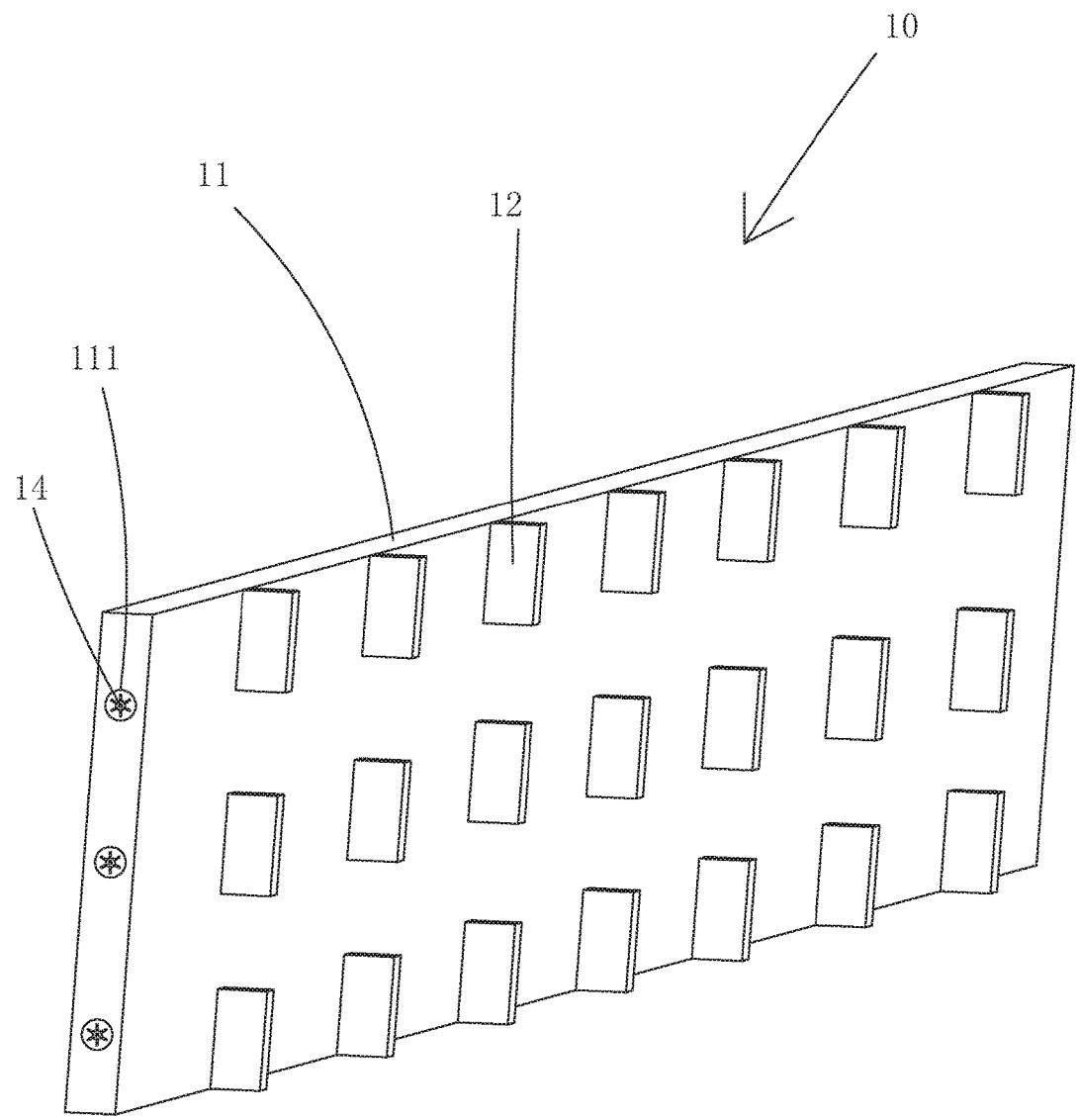
FIG. 1 is a perspective view illustrating a heat dissipation module according to the present invention.
Figure 2:
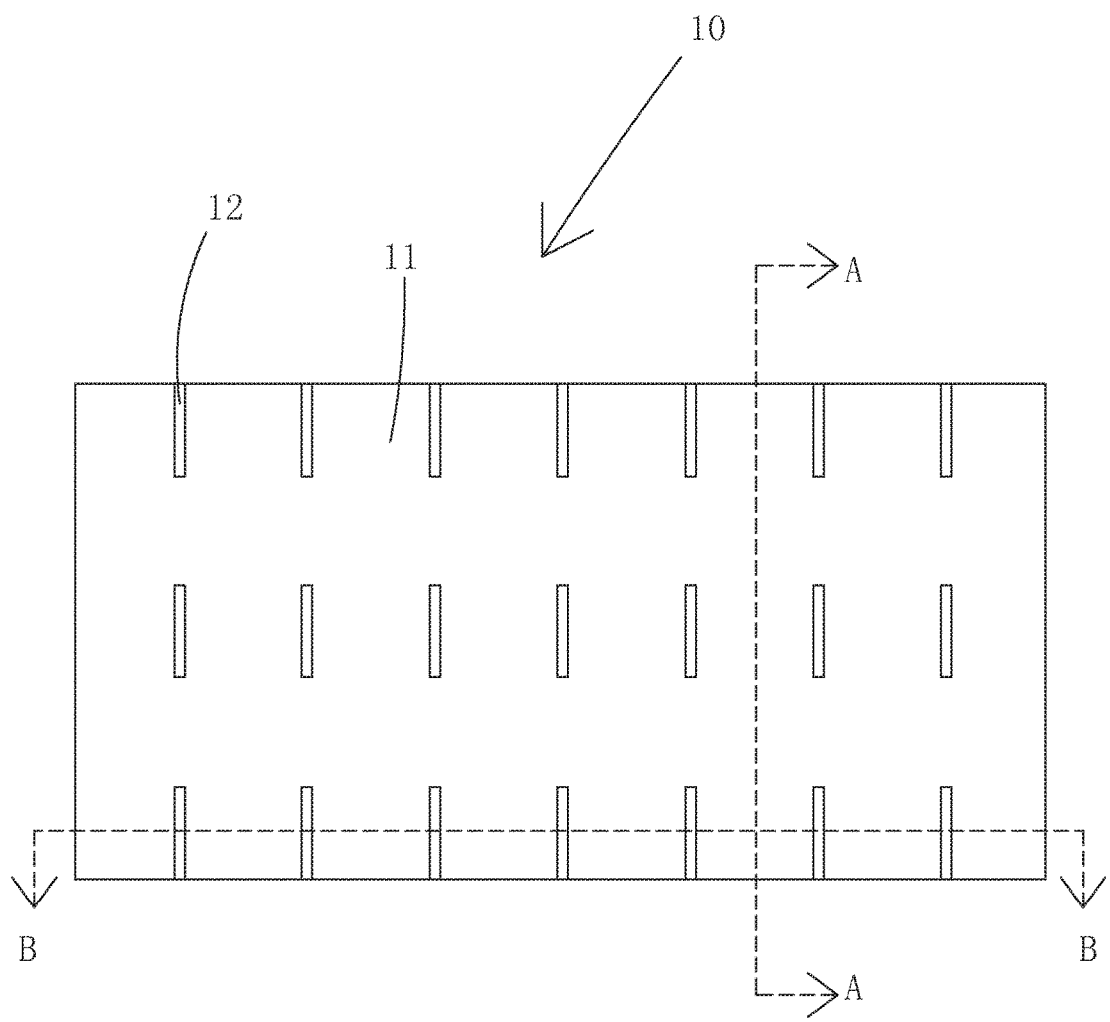
FIG. 2 is a front view illustrating the heat dissipation module according to the present invention.
Figure 3:
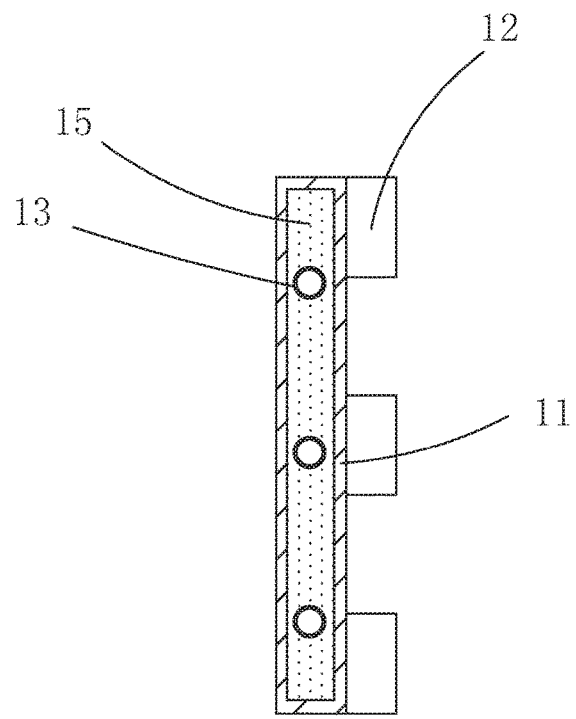
FIG. 3 is a cross-sectional view taken along line A-A of FIG. 2.

Referring collectively to FIGS. 1-4, firstly, the present invention provides a heat dissipation module 10, which is applicable to dissipation of heat generated by a lightbar of a backlight module of a liquid crystal display. As shown in FIGS. 1-3, the heat dissipation module 10 comprises a hollow heat dissipation chamber 11, a plurality of first heat dissipation fins 12 arranged on a side surface of the heat dissipation chamber 11 and extending to the outside of and away from the heat dissipation chamber 11, a plurality of airflow ducts 13 arranged in an interior space of the heat dissipation chamber 11 and each having two ends respectively connected to two end surfaces of the heat dissipation chamber 11, and a plurality of pairs of cocurrent fans 14 arranged on the two end surfaces of the heat dissipation chamber 11 to respectively correspond to the two ends of the plurality of airflow ducts 13. The two end surfaces of the heat dissipation chamber 11 are provided with a plurality of first airflow openings 111 respectively corresponding to the two ends of the plurality of airflow ducts 13. Internal spaces of the plurality of airflow ducts 13 are set in communication with an outside space of the heat dissipation chamber 11 through the first airflow openings 111.

It is noted here that to use the above-described heat dissipation module 10, the lightbar is installed on one another side of the heat dissipation chamber 11 that is opposite to the first heat dissipation fins 12 so as to allow the heat generated by the lightbar to be dissipated. The heat dissipation module 10 is provided with a plurality of airflow ducts 13 arranged in the interior space of the heat dissipation chamber 11 and two ends of the plurality of airflow ducts 13 are respectively connected to two end surfaces of the heat dissipation chamber 11 with internal spaces of the plurality of airflow ducts 13 in communication with the outside of the heat dissipation chamber, and further, the heat dissipation chamber 11 is provided with a plurality of pairs of cocurrent fans 14 arranged to respectively correspond to the two ends of the plurality of airflow ducts 13. To use, the cocurrent fans 14 are activated such that one of each pair of the cocurrent fans 14 supplies air into the internal space of the corresponding one of the airflow ducts 13, while another one of the pair of cocurrent fans 14 withdraws and discharges air from the internal space of the airflow duct 13 to the outside of the heat dissipation chamber 11 so as to form a gas circulation path that dissipates heat generated by the lightbar that is arranged on the heat dissipation chamber 11 and transferred to the heat dissipation chamber 11 to the outside of the heat dissipation module 10. In addition, with the plurality of first heat dissipation fins 12 operated simultaneously for dissipation of heat, the heat generated by the lightbar can be effectively removed to prevent excessive heat from causing reduction of the lifespan of the liquid crystal display.

Preferably, the first airflow openings 111 are circular holes and each pair of cocurrent fans 14 is arranged in the first airflow openings 111 corresponding thereto to achieve a more effective operation of supplying and draining air into and out of the airflow duct 13.

Specifically, the plurality of airflow ducts 13 are arranged in the heat dissipation chamber 11 at such locations that are determined according to an actual condition of heat generation of the lightbar. Preferably, the plurality of airflow ducts 13 are arranged parallel and uniformly distributed in the interior space of the heat dissipation chamber 11 in order to provide uniform heat dissipation for heat generated by the lightbar and transferred to the heat dissipation chamber 11.

Preferably, the heat dissipation module 10 further comprises a coolant liquid 15 filled between an outer wall of each of the airflow ducts 13 and an inner wall of the heat dissipation chamber 11 to further enhance a heat transfer efficiency of the heat dissipation module 10 and thus improving heat dissipation performance.

Preferably, the plurality of first heat dissipation fins 12 are densely arranged in the form of an array.

Figure 4:
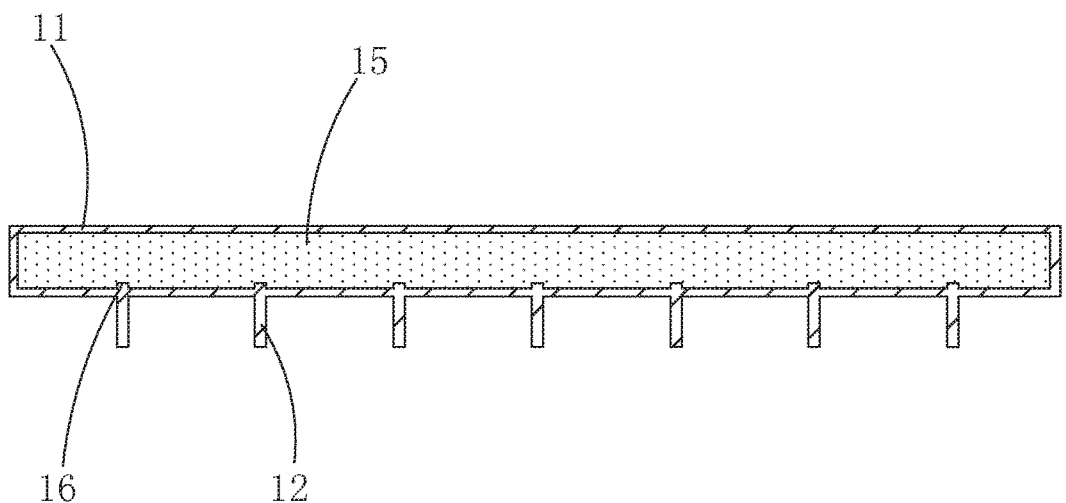
FIG. 4 is a cross-sectional view taken along line B-B of FIG. 2.

Optionally, referring to FIG. 4, in an example of the present invention, the heat dissipation module 10 further comprises a plurality of second heat dissipation fins 16 arranged on the side surface of the heat dissipation chamber 11 on which the first heat dissipation fins 12 are arranged and extending into the interior space of the heat dissipation chamber 11. The plurality of second heat dissipation fins 16 are respectively arranged to correspond, in position, to the plurality of first heat dissipation fins 12. The first heat dissipation fins 12 have a height that is greater than a height of the second heat dissipation fins 16. The arrangement of the second heat dissipation fins 16 helps expand a heat dissipation surface area of the heat dissipation module 10 to thereby enhance the heat dissipation performance of the heat dissipation module 10.

Figure 5:
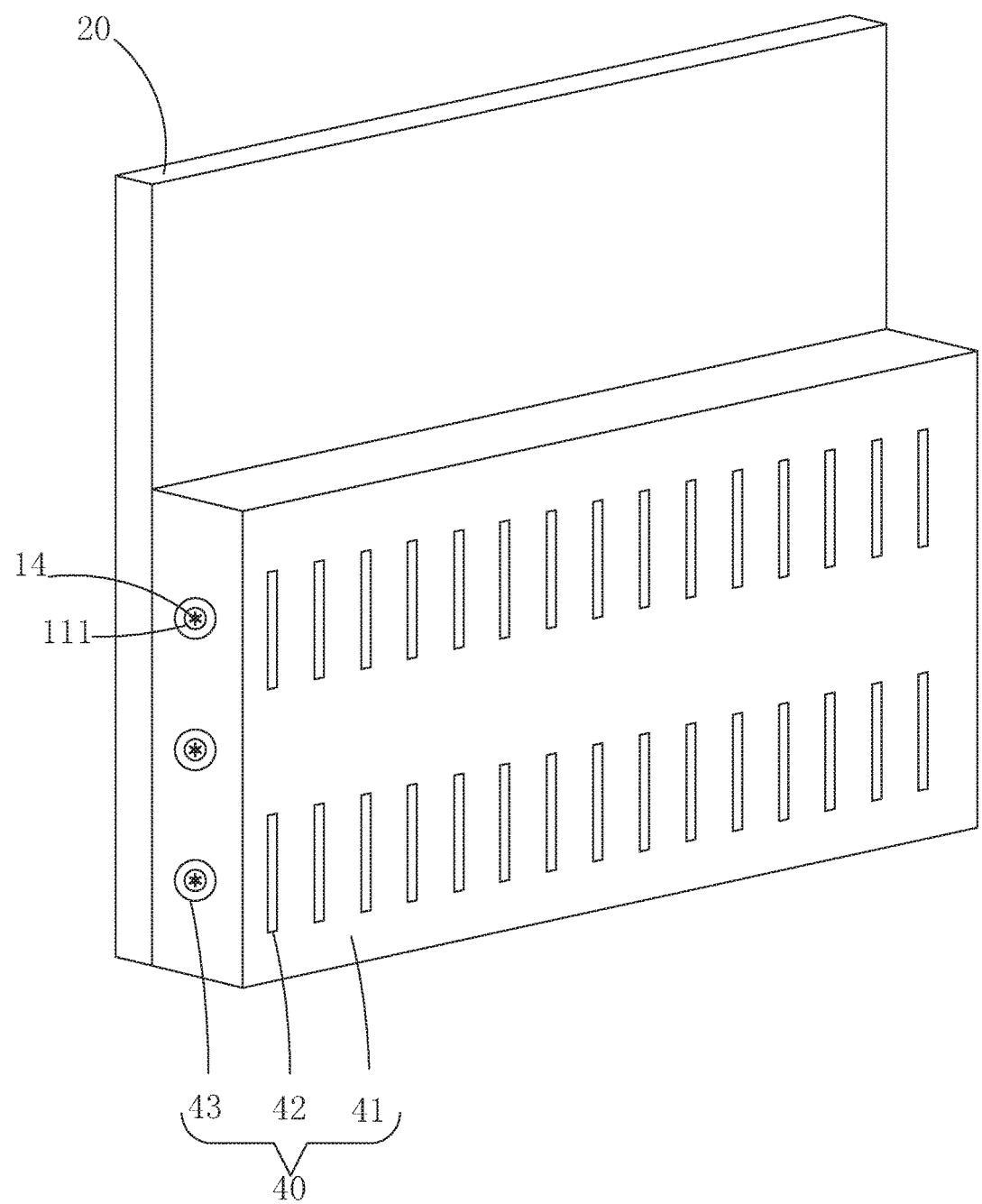
FIG. 5 is a perspective view illustrating a liquid crystal display according to the present invention.
Figure 6:
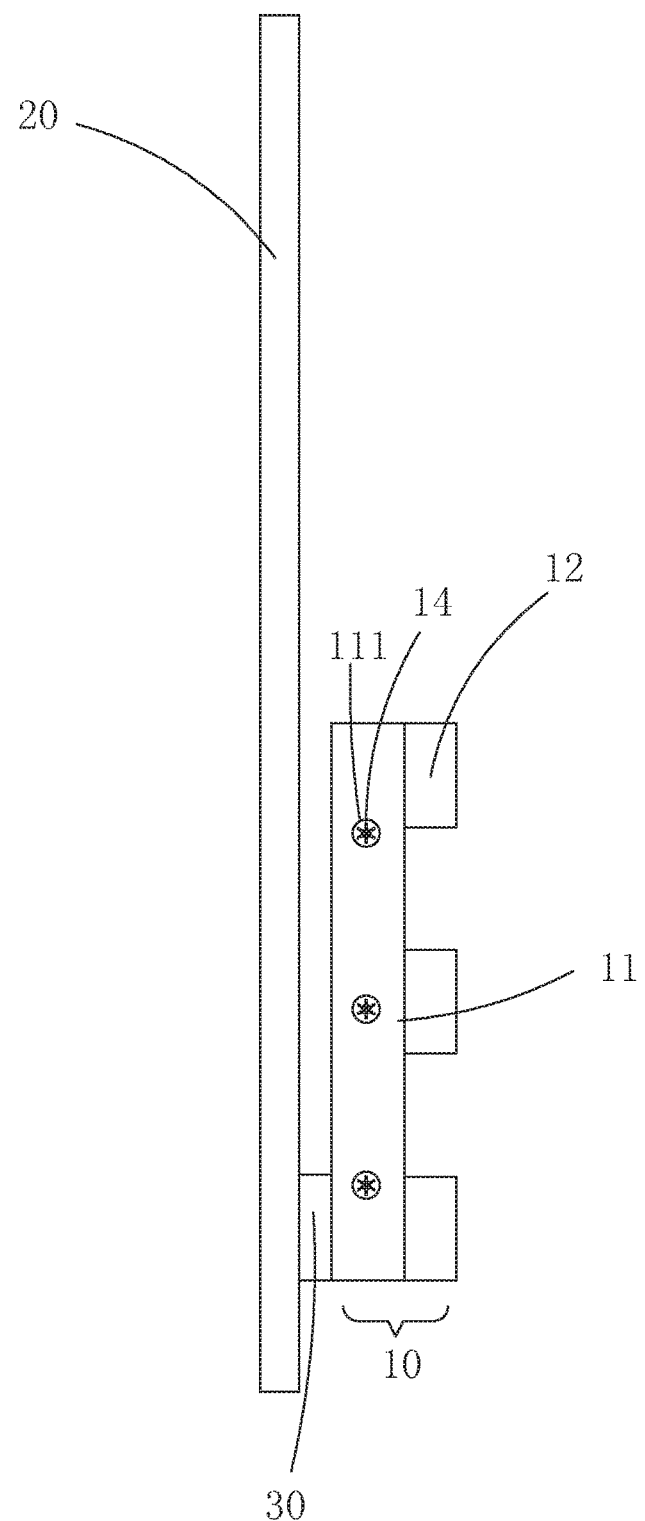
FIG. 6 is a side elevational view illustrating the liquid crystal display according to the present invention with an enclosure removed.

Referring to FIGS. 5 and 6, in combination with FIGS. 1-4, based on the above-described heat dissipation module 10, the present invention also provides a liquid crystal display, which comprises a display module 20, a heat dissipation module 10 arranged on a back of the display module 20, and a lightbar 30 arranged on a side of the heat dissipation module 10 that is adjacent to the display module 20.

The heat dissipation module 10 comprises a hollow heat dissipation chamber 11, a plurality of first heat dissipation fins 12 arranged on a side surface of the heat dissipation chamber 11 that is distant from the lightbar 30 and extending to the outside of the heat dissipation chamber 11, a plurality of airflow ducts 13 arranged in an interior space of the heat dissipation chamber 11 and each having two ends respectively connected to two end surfaces of the heat dissipation chamber 11, and a plurality of pairs of cocurrent fans 14 arranged on the two end surfaces of the heat dissipation chamber 11 to respectively correspond to the two ends of the plurality of airflow ducts 13. The two end surfaces of the heat dissipation chamber 11 are provided with a plurality of first airflow openings 111 respectively corresponding to the two ends of the plurality of airflow ducts 13. Internal spaces of the plurality of airflow ducts 13 are set in communication with an outside space of the heat dissipation chamber 11 through the first airflow openings 111.

It is noted here that in the above-described liquid crystal display, the lightbar 30 provides backlighting to the display module 20 and the heat dissipation module 10 dissipates heat generated by the lightbar 30 when it is lit. The heat dissipation module 10 is provided with a plurality of airflow ducts 13 arranged in the interior space of the heat dissipation chamber 11 and two ends of the plurality of airflow ducts 13 are respectively connected to two end surfaces of the heat dissipation chamber 11 with internal spaces of the plurality of airflow ducts 13 in communication with the outside of the heat dissipation chamber, and further, the heat dissipation chamber 11 is provided with a plurality of pairs of cocurrent fans 14 arranged to respectively correspond to the two ends of the plurality of airflow ducts 13. When the liquid crystal display is in operation to display images, the cocurrent fans 14 are activated such that one of each pair of the cocurrent fans 14 supplies air into the internal space of the corresponding one of the airflow ducts 13, while another one of the pair of cocurrent fans 14 withdraws and discharges air from the internal space of the airflow duct 13 to the outside of the heat dissipation chamber 11 so as to form a gas circulation path that dissipates heat generated by the lightbar that is arranged on the heat dissipation chamber 11 and transferred to the heat dissipation chamber 11 to the outside of the heat dissipation module 10. In addition, with the plurality of first heat dissipation fins 12 operated simultaneously for dissipation of heat, the heat generated by the lightbar 30 can be effectively removed to prevent excessive heat from causing reduction of the lifespan of the liquid crystal display.

Specifically, the liquid crystal display further comprises an enclosure 40 that is arranged on the back of the display module 20 and houses the heat dissipation module 10 to isolate the heat dissipation module 10 from the outside environment. The enclosure 40 comprises a casing 41, a plurality of heat dissipation holes 42 formed in the casing 41, and a plurality of second airflow openings 43 respectively corresponding to the plurality of pairs of cocurrent fans 14 to further drain heat dissipated through the heat dissipation module 10 to the outside of the liquid crystal display. Preferably, the second airflow openings 43 are circular holes and the heat dissipation holes 42 are elongate openings.

Preferably, the first airflow openings 111 are circular holes and each pair of cocurrent fans 14 is arranged in the first airflow openings 111 corresponding thereto to achieve a more effective operation of supplying and draining air into and out of the airflow duct 13.

Specifically, the plurality of airflow ducts 13 are arranged in the heat dissipation chamber 11 at such locations that are determined according to an actual condition of heat generation of the lightbar 30. Preferably, the plurality of airflow ducts 13 are arranged parallel and uniformly distributed in the interior space of the heat dissipation chamber 11 in order to provide uniform heat dissipation for heat generated by the lightbar 30 and transferred to the heat dissipation chamber 11.

Preferably, the heat dissipation module 10 further comprises a coolant liquid 15 filled between an outer wall of each of the airflow ducts 13 and an inner wall of the heat dissipation chamber 11 to further enhance a heat transfer efficiency of the heat dissipation module 10 and thus improving heat dissipation performance.

Preferably, the plurality of first heat dissipation fins 12 are densely arranged in the form of an array.

Optionally, referring to FIG. 4, in an example of the present invention, the heat dissipation module 10 further comprises a plurality of second heat dissipation fins 16 arranged on the side surface of the heat dissipation chamber 11 on which the first heat dissipation fins 12 are arranged and extending into the interior space of the heat dissipation chamber 11. The plurality of second heat dissipation fins 16 are respectively arranged to correspond, in position, to the plurality of first heat dissipation fins 12. The first heat dissipation fins 12 have a height that is greater than a height of the second heat dissipation fins 16. The arrangement of the second heat dissipation fins 16 helps expand a heat dissipation surface area of the heat dissipation module 10 to thereby enhance the heat dissipation performance of the heat dissipation module 10.

In summary, the present invention provides a heat dissipation module, in which a plurality of airflow ducts are arranged in an interior space of a heat dissipation chamber with two ends of the plurality of airflow ducts being respectively connected to two end surfaces of the heat dissipation chamber and internal spaces of the plurality of airflow ducts set in communication with the outside of the heat dissipation chamber, and further, a plurality of pairs of cocurrent fans are provided on the heat dissipation chamber to respectively correspond to the two ends of the plurality of airflow ducts and a coolant liquid is filled between outer walls of the airflow ducts and an inner wall of the heat dissipation chamber so that the heat dissipation module is applicable to a liquid crystal display to effectively dissipate heat generated by a lightbar and thus extend the lifespan of the liquid crystal display. The present invention provides a liquid crystal display, which includes the above-described heat dissipation module to provide excellent performance of heat dissipation and extended lifespan.

Based on the description given above, those having ordinary skills in the art may easily contemplate various changes and modifications of he technical solution and the technical ideas of the present invention. All these changes and modifications are considered belonging to the protection scope of the present invention as defined in the appended claims.

What is claimed is:

1. A combination of a heat dissipation module and a heat generating device, wherein the heat dissipation module comprises:
   a hollow heat dissipation chamber, which has a first side surface and a second side surface that is spaced from the first side surface;
   a plurality of first heat dissipation fins, which is arranged on the first side surface of the heat dissipation chamber and located externally of the heat dissipation chamber and extending away from the heat dissipation chamber;
   a plurality of airflow ducts, which is arranged in an interior space of the heat dissipation chamber delimited by the first and second side surfaces of the heat dissipation chamber, each of the airflow ducts having two ends respectively connected to two end surfaces of the heat dissipation chamber and spaced from the second side surface of the heat dissipation chamber; and
   a plurality of pairs of fans, which are arranged on the two end surfaces of the heat dissipation chamber to respectively correspond to the two ends of the plurality of airflow ducts, the two end surfaces of the heat dissipation chamber being provided with a plurality of first airflow openings respectively corresponding to the two ends of the plurality of airflow ducts, internal spaces of the plurality of airflow ducts being set in communication with an outside space of the heat dissipation chamber through the first airflow openings;
   wherein the heat generating device is arranged on the second side surface of the heat dissipation chamber to partly overlap and directly contact the second side surface of the heat dissipation chamber and is located outside the heat dissipation chamber, such that heat generated by the heat generating device is transmitted to the heat dissipation chamber; and
   wherein each of the pairs of fans is arranged to correspond to one of the plurality of airflow ducts and comprises a first fan and a second fan respectively corresponding to the two ends of the one of the plurality of airflow ducts, the first fan driving an airflow into the internal space of the one of the plurality of airflow ducts and the second fan driving the airflow out of the internal space of the one of the plurality of airflow ducts, wherein the airflow moves in a direction between the two ends of the one of the plurality of airflow ducts at a location that is spaced from the second side surface of the heat dissipation chamber and external of the heat generating device to dissipate away the heat transmitted from the heat generating device to the heat dissipation chamber.

2. The combination as claimed in claim 1, wherein each of the plurality of pairs of fans is arranged in the first airflow openings corresponding thereto.

3. The combination as claimed in claim 1, wherein the plurality of airflow ducts are parallel with each other and are uniformly distributed in the interior space of the heat dissipation chamber.

4. The combination as claimed in claim 1 further comprising a coolant liquid filled between the plurality of airflow ducts and the first and second side surfaces and the two end surfaces of the heat dissipation chamber.

5. The heat dissipation module as claimed in claim 1 further comprising a plurality of second heat dissipation fins arranged on the first side surface of the heat dissipation chamber on which the first heat dissipation fins are arranged and extending into the interior space of the heat dissipation chamber, the plurality of second heat dissipation fins respectively corresponding, in position, to the plurality of first heat dissipation fins, the first heat dissipation fins having a height greater than a height of the second heat dissipation fins.

6. A liquid crystal display, comprising:
   a display module;
   a heat dissipation module arranged on a back of the display module;
   and a lightbar arranged on a side of the heat dissipation module that is adjacent to the display module;
   wherein the heat dissipation module comprises:
   a hollow heat dissipation chamber, which has a first side surface and a second side surface that is spaced from the first side surface,
   a plurality of first heat dissipation fins, which is arranged on the first side surface of the heat dissipation chamber and located externally of the heat dissipation chamber and extending away from the heat dissipation chamber, a plurality of airflow ducts, which is arranged in an interior space of the heat dissipation chamber delimited by the first and second side surfaces of the heat dissipation chamber, each of the airflow ducts having two ends respectively connected to two end surfaces of the heat dissipation chamber and spaced from the second side surface of the heat dissipation chamber, and a plurality of pairs of fans, which are arranged on the two end surfaces of the heat dissipation chamber to respectively correspond to the two ends of the plurality of airflow ducts, the two end surfaces of the heat dissipation chamber being provided with a plurality of first airflow openings respectively corresponding to the two ends of the plurality of airflow ducts, internal spaces of the plurality of airflow ducts being set in communication with an outside space of the heat dissipation chamber through the first airflow openings;

wherein the lightbar is arranged on the second side surface of the heat dissipation chamber to partly overlap and directly contact the second side surface of the heat dissipation chamber and is located outside the heat dissipation chamber, such that heat generated by the lightbar is transmitted to the heat dissipation chamber; and wherein each of the pairs of fans is arranged to correspond to one of the plurality of airflow ducts and comprises a first fan and a second fan respectively corresponding to the two ends of the one of the plurality of airflow ducts, the first fan driving an airflow into the internal space of the one of the plurality of airflow ducts and the second fan driving the airflow out of the internal space of the one of the plurality of airflow ducts, wherein the airflow moves in a direction between the two ends of the one of the plurality of airflow ducts at a location that is spaced from the second side surface of the heat dissipation chamber and external of the lightbar to dissipate away the heat transmitted from the lightbar to the heat dissipation chamber.

7. The liquid crystal display as claimed in claim 6, wherein each pair of the plurality of pairs of fans is arranged in the first airflow openings corresponding thereto.

8. The liquid crystal display as claimed in claim 6, wherein the plurality of airflow ducts are parallel with each other and are uniformly distributed in the interior space of the heat dissipation chamber.

9. The liquid crystal display as claimed in claim 6, wherein the heat dissipation module further comprises a coolant liquid filled between the plurality of airflow ducts and the first and second side surfaces and the two end surfaces of the heat dissipation chamber.

10. The liquid crystal display as claimed in claim 6, wherein the heat dissipation module further comprises a plurality of second heat dissipation fins arranged on the first side surface of the heat dissipation chamber on which the first heat dissipation fins are arranged and extending into the interior space of the heat dissipation chamber, the plurality of second heat dissipation fins respectively corresponding, in position, to the plurality of first heat dissipation fins, the first heat dissipation fins having a height greater than a height of the second heat dissipation fins.

11. The liquid crystal display as claimed in claim 6 further comprising an enclosure that is arranged on the back of the display module and houses the heat dissipation module;

wherein the enclosure comprises a casing, a plurality of heat dissipation holes formed in the casing, and a plurality of second airflow openings respectively corresponding to the plurality of pairs of fans.

12. A liquid crystal display, comprising:

a display module;

a heat dissipation module arranged on a back of the display module;

and a lightbar arranged on a side of the heat dissipation module that is adjacent to the display module;

wherein the heat dissipation module comprises:

a hollow heat dissipation chamber, which has a first side surface and a second side surface that is spaced from the first side surface, a plurality of first heat dissipation fins, which is arranged on the first side surface of the heat dissipation chamber and located externally of the heat dissipation chamber and extending away from the heat dissipation chamber, a plurality of airflow ducts, which is arranged in an interior space of the heat dissipation chamber delimited by the first and second side surfaces of the heat dissipation chamber, each of the airflow ducts having two ends respectively connected to two end surfaces of the heat dissipation chamber and spaced from the second side surface of the heat dissipation chamber, and a plurality of pairs of fans, which are arranged on the two end surfaces of the heat dissipation chamber to respectively correspond to the two ends of the plurality of airflow ducts, the two end surfaces of the heat dissipation chamber being provided with a plurality of first airflow openings respectively corresponding to the two ends of the plurality of airflow ducts, internal spaces of the plurality of airflow ducts being set in communication with an outside space of the heat dissipation chamber through the first airflow openings;

wherein the lightbar is arranged on the second side surface of the heat dissipation chamber and is located outside the heat dissipation chamber, such that heat generated by the lightbar is transmitted to the heat dissipation chamber;

wherein each of the pairs of fans is arranged to correspond to one of the plurality of airflow ducts and comprises a first fan and a second fan respectively corresponding to the two ends of the one of the plurality of airflow ducts, the first fan driving an airflow into the internal space of the one of the plurality of airflow ducts and the second fan driving the airflow out of the internal space of the one of the plurality of airflow ducts, wherein the airflow moves in a direction between the two ends of the one of the plurality of airflow ducts at a location that is spaced from the second side surface of the heat dissipation chamber and external of the lightbar to dissipate away the heat transmitted from the lightbar to the heat dissipation chamber;

wherein each pair of the plurality of pairs of fans is arranged in the first airflow openings corresponding thereto;

wherein the plurality of airflow ducts are parallel with each other and are uniformly distributed in the interior space of the heat dissipation chamber; and wherein the heat dissipation module further comprises a coolant liquid filled between the plurality of airflow ducts and the first and second side surfaces and the two end surfaces of the heat dissipation chamber.

13. The liquid crystal display as claimed in claim 12, wherein the heat dissipation module further comprises a plurality of second heat dissipation fins arranged on the first side surface of the heat dissipation chamber on which the first heat dissipation fins are arranged and extending into the interior space of the heat dissipation chamber, the plurality of second heat dissipation fins respectively corresponding, in position, to the plurality of first heat dissipation fins, the first heat dissipation fins having a height greater than a height of the second heat dissipation fins.

14. The liquid crystal display as claimed in claim 12 further comprising an enclosure that is arranged on the back of the display module and houses the heat dissipation module;

wherein the enclosure comprises a casing, a plurality of heat dissipation holes formed in the casing, and a plurality of second airflow openings respectively corresponding to the plurality of pairs of fans.

* * * * *